No. 811,852. PATENTED FEB. 6, 1906.
I. KITSEE.
METHOD OF ASCERTAINING THE COMPASS DIRECTION OF MOVING OBJECTS.
APPLICATION FILED MAY 18, 1901. RENEWED JAN. 15, 1903.
2 SHEETS—SHEET 1.
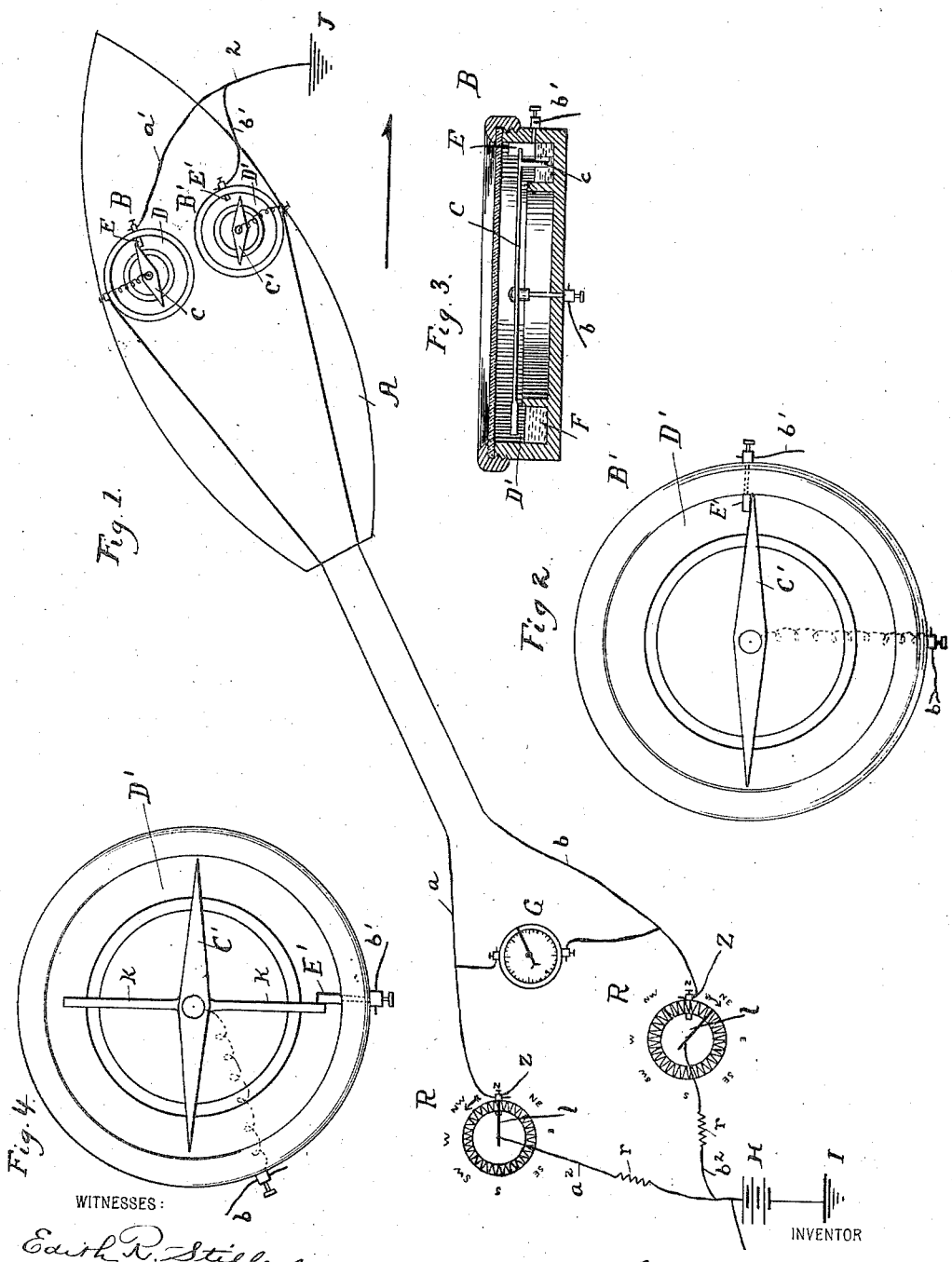

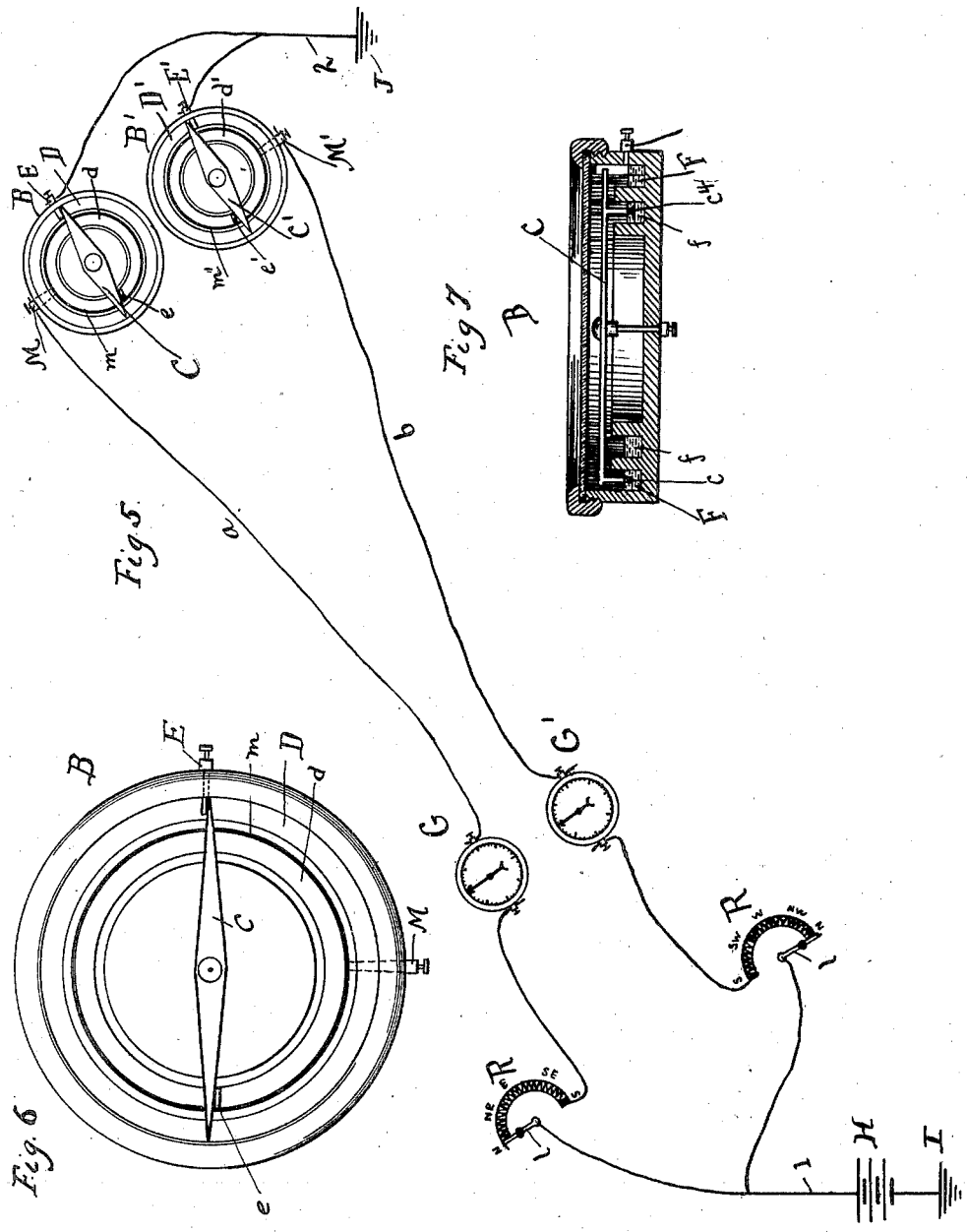

UNITED STATES PATENT OFFICE.

ISIDOR KITSEE, OF PHILADELPHIA, PENNSYLVANIA.

METHOD OF ASCERTAINING THE COMPASS DIRECTION OF MOVING OBJECTS.

No. 811,852.

Specification of Letters Patent.

Patented Feb. 6, 1906.

Application filed May 18, 1901. Renewed January 15, 1903. Serial No. 139,226.

*To all whom it may concern:*

Be it known that I, ISIDOR KITSEE, of the city and county of Philadelphia, State of Pennsylvania, have invented certain new and useful Improvements in the Method of Ascertaining the Compass Direction of Moving Objects, of which the following is a specification.

My invention relates to an improvement in the method of ascertaining the compass direction of moving objects.

Generally speaking, my invention consists therein that the varying resistance of a circuit due to the varying position of the magnet-needle is indicated by an electric device—such, for instance, as a galvanometer—and this my invention has more special reference to the method of ascertaining the compass direction of such moving objects—as, for instance, dirigible torpedoes and the like.

Dirigible torpedoes were tried in the navy of nearly every government and would have been adopted by the authorities were it not for one defect to which all dirigible torpedoes no matter of what construction are subject—the inability by the operator to ascertain their compass direction after he has lost sight of same or after they have traveled out of view.

Referring to the drawings, Figure 1 is a diagrammatic view showing my invention in operation. Fig. 2 is a detail plan view of one of the compasses used. Fig. 3 is a cross-section of one of the compasses. Fig. 4 is a plan view of one of the compasses, showing a modification of same. Fig. 5 is a diagrammatic view of my invention in a modified form. Fig 6 is a detail plan view of one of the compasses used in this modified form. Fig. 7 is a cross-section of one of the compasses.

A is a torpedo or other object to be steered.

B B' are the two compasses, provided, respectively, with the needles C and C'.

D and D' are the channels formed upon the interior of the compass-cases.

*c* is a contact depending from the needles C and C'.

E and E' are terminals for the wires $a'$ and $b'$. These terminals act also as stops for the needles.

F is the conducting liquid contained in the grooves or channels D and D'.

G is a galvanometer or other indicator.

$a$, $b$, $a'$, $b'$, $a^2$, and $b^2$ are the branches of a Wheatstone bridge connected to the wires 1 and 2. The wire 1 is grounded with the interposition of battery H at I. This ground consists, in the case where the moving object is floating on the ocean, of a conductor in contact with the water. The wire 2 is connected directly to the ground-plate J.

R R are variable resistances in conjunction with the resistances *r r*. The office of the resistances *r r* is to make the resistance value of the part $a^2 b^2$ of the Wheatstone bridge equal to the part $a b$ and $a' b'$. The resistances R are provided each with the lever 1, with the aid of which more or less resistance can be placed in the circuit.

In Fig. 4 a modification is shown in which the contact *c* instead of being formed with the needle is formed with the cross-arm K. This cross-arm is secured to the needle and is carried by the same in a manner so as to revolve therewith.

In practicing my invention it is first necessary to calibrate the variable resistances R R and to provide the same with dials which are a counterpart of the dials of the compasses. In calibrating it is best to proceed in the following manner: The two ends of the cable designed to form the connecting-link between the moving torpedo and the operator's vessel are made the intervening circuit of a Wheatstone bridge, in which are placed at one end the compasses of the construction, as specified, and at the other end the two variable resistances R R, the faces of the dials of which are at the beginning entirely void of any lettering. In the normal position—that is, when the needles of both compasses touch the respective conducting-points and when the levers 1 of the resistances R connect with the contact-points Z—then the resistance of all parts of the bridge should be equal, and the needle of the galvanometer G shall therefore point to zero. To calibrate the resistance R, it is only necessary to rotate the case of one of the compasses in a manner so that the needle should successively assume different positions as to the zero-point of the dial, thereby indicating different compass directions. As soon as the compass-needle is out of contact with its contact-point a resistance is inserted in one branch of the bridge and the current-flow through the galvanometer will be unequal and the needle of this galvanometer will indicate the degree of current flowing. The lever l of one or the other of the resistances R has then to be moved so as to insert an equal resistance in the other part of the bridge-circuit, thereby again equalizing the flow of the current through the galvanometer G and bringing the needle of this instrument again to zero. The value of resistance necessary to counteract the resistance due to the position of the compass-needle is then marked on the dial of the resistance R. For instance, if the compass direction of both of the compasses is due north both needles will contact with the contact-points E and E'. In this case the levers l of the resistances R will also connect with the contact-points Z Z. The resistances being equal, the needle of the galvanometer will point to zero. On the dial of the resistances R this position of the levers may then be marked "N," (north.) If now the right-hand compass is revolved in a manner so that the needle should indicate "N. E.," then the resistance inserted in that part of the bridge in which this particular compass is inserted will disturb the balance of the bridge, and the galvanometer-needle will indicate this disturbance. The lever l of the right-hand resistance R is then moved in a manner so as to insert an equal resistance in the bridge, again equalizing the bridge as to the flow of the current through the galvanometer. Through this manipulation the needle of the galvanometer will again assume its zero position, and the position of the lever l should be marked on the dial of the resistance R "N. E.," (northeast,) and so on till all the compass directions marked on the dial of the compass correspond with the dial-marks on the variable resistances.

In Fig. 5 each of the compasses is provided with two annular grooves or channels D and d, respectively. In the liquid F of the groove D the conducting-point c of the needle C dips, and in the liquid f of the groove d the conducting-point $c^4$ dips. The annular groove D is provided with the conducting-point E, used also as a stop for the needle C in one direction, and the groove d is provided with the metallic rim m around its inner circumference, which rim is in electrical contact with the binding-post M. No matter, therefore, in what position the conducting-point $c^4$ is the resistence between this point and the binding-post M will always remain the same, because the distance of this point from the inner conductor m will always remain uniform. Two line-wires a and b are used in this modification. In each line-wire is inserted one of the compasses B and B'. One part of the circuit a is connected to the binding-post M and the other part of this circuit or line-wire is connected to the binding-post E. As long as the needle C rests against the stop E the current will flow directly from M, through m, liquid f, conducting-point $c^4$, which is always at equal distance from this conductor m, through the needle-contact E to the ground; but as soon as the needle moves away from the contact then the resistance, consisting of the liquid F, is inserted in the line-wire. Both compasses B and B' are equal in construction and in the mode of operation, with the exception that the stop e prevents the needle of one compass to move in one direction and prevents the needle of the other compass to move in the opposite direction. Both compasses are lettered alike, with the exception that the letters in one compass are also provided with the numeral "1." These compasses are placed on the moving object or torpedo. At the operator's station the line-wires a and b are provided each with one of the galvanometers G and G', respectively. Each line-wire is also provided with one of the variable resistances R. Normally all the resistance of each of the devices is placed in the circuit, and if both compass-needles rest against their stops then the resistance of both circuits will be equal and the needles of the galvanometers will both point to the same degree of deflection. If now the needle of one of the galvanometers moves from this stop, an additional resistance will be inserted in the line of which the particular galvanometer forms part. The needle of the indicating device will therefore point to a different degree than the needle of the indicating device inserted in the other circuit. With the aid of the lever l such part of the resistance R is then cut out of the circuit as will be equal in value to the resistance placed in the circuit by the moving of the needle of the compass. If the needle of the galvanometer in this line will point to the same degree of deflection as the needle of the galvanometer of the other line-wire, then the resistance cut-out with the aid of the lever l will equal in value the resistance placed in the line-wire through the movement of the compass-needle, and as the resistance device R is provided with a scale indicating the degree of resistance by the degree of the compass it is obvious that through the moving of the lever the direction of the compass-needle can easily be ascertained if both the compass-resistance F and the resistance R are first calibrated and their respective relative values ascertained.

A valuable auxiliary to this my invention is the so-called "sighting-chart" or "position-finder" used to-day for sighting heavy ordnance, and with the aid of same in conjunction with my invention the compass direction of the torpedo, &c., for each length of cable paid out can be ascertained to a nicety.

As a liquid resistance for the compasses either diluted sulfuric acid or any of the neutral salts can be used—as, for instance, sulfate of iron—or, in fact, any liquid which is made conducting by the addition of a metallic salt or acid.

I have described and illustrated the compasses as provided with an annular groove; but it is understood that the whole inner space can be filled with the liquid without departing from the scope of my invention. If an annular groove is used, the compass has to be provided with a device capable of keeping the case always in a horizontal position.

I am well aware that the device as illustrated and described is subject to different modifications; but as I am the first to ascertain the compass direction of moving objects by the different degree of resistance due to the different positions of the needle such modifications are included in this my invention.

It is preferred that all conducting parts of the compass-needle as well as the casing, with the exception of that side of the contact-point with which the needle normally connects, and the conducting part of the needle itself, should be well insulated with shellac or other insulating material.

I am also well aware that the needle of a compass always points north, and, strictly speaking, the position of the compass-needle does not vary; but, as it is a common phrase to speak of the needle "varying in position" and not of the compass-case to vary the direction I make use of the expressions "varying needle" or "varying compass-needle" and understand under them that the needle points to a different part of the dial through the moving of the object on which the dial is placed.

The distinction between the invention covered by this case and that covered by my pending application, Serial No. 60,958, filed May 18, 1901, resides in the fact that the compass direction in this case is not indicated automatically, but only after the variable resistances are manually operated to restore the balance of the bridge, while in application Serial No. 60,958 the compass-direction is automatically indicated.

Having now described my invention, what I claim as new, and desire to secure by Letters Patent, is—

1. The method of ascertaining the compass direction of moving objects, which consists in passing a current of electricity through a movable member of a compass, and a resistance which changes the flow of the current in accordance with the direction of the moving object, causing an indicator to vary in accordance with the current-flow, and indicating the compass direction of the moving object by a variable resistance through the medium of which latter said indicator is restored to equilibrium.

2. The method of ascertaining the compass direction of moving objects, which consists in passing a current of electricity through a movable member of a compass and a Wheatstone bridge, disturbing the balance of said bridge by the varying position of said movable compass member, and restoring the balance of the bridge by a variable resistance adapted to indicate, through the degree of resistance necessary for the restoration of the balance of said bridge, the compass direction of the moving object.

3. The method of ascertaining the compass direction of moving objects, which consists in passing a current of electricity through a movable member of a compass and a Wheatstone bridge, disturbing the balance of said bridge by the varying position of said movable compass member, indicating the disturbed condition of said balance in accordance with the varying position of the movable compass member, and restoring the balance of the bridge by a variable resistance adapted to indicate, through the degree of resistance necessary for the restoration of the balance of said bridge, the compass direction of the moving object.

4. The method of ascertaining the compass direction of moving objects, which consists in passing a current of electricity through a movable member of a compass and a Wheatstone bridge, disturbing the balance of said bridge by increasing the resistance of one arm thereof through the varying position of the movable member of the compass, and restoring the balance of said bridge by decreasing the resistance of said arm until such resistance is equal to that of the second arm of the bridge, the value of the resistance removed from the first-mentioned arm being adapted to indicate the compass direction of the moving object.

5. The method of ascertaining the compass direction of moving objects, which consists in passing a current of electricity through a movable member of a compass and a Wheatstone bridge, disturbing the balance of said bridge by increasing the resistance of one arm thereof through the varying position of the movable member of the compass, indicating the degree of increased resistance, and restoring the balance of said bridge by decreasing the resistance of said arm until such resistance is equal to that of the second arm of the bridge, the value of the resistance removed from the first-mentioned arm being adapted to indicate the compass direction of the moving object.

6. The method of ascertaining the compass direction of moving objects, which consists in passing a current of electricity through a movable member of a compass and a Wheatstone bridge, disturbing the balance of said bridge by increasing the resistance of one arm thereof through the varying position of the movable member of the compass, and restoring the balance of said bridge through the medium of a variable resistance by means of which the resistance in said arm is equalized with the resistance in a second arm of the bridge, said variable resistance being adapted to indicate the compass direction of the moving object.

In testimony whereof I hereby sign my name, in the presence of two subscribing witnesses, this 14th day of May, A.D. 1901.

ISIDOR KITSEE.

Witnesses:
  WALLACE B. ELDRIDGE,
  EDITH R. STILLEY.